(12) United States Patent
Maiolani et al.

(10) Patent No.: US 9,552,279 B2
(45) Date of Patent: Jan. 24, 2017

(54) DATA BUS NETWORK INTERFACE MODULE AND METHOD THEREFOR

(71) Applicants: Mark Maiolani, Glasgow (GB); Ray C. Marshall, Harpenden (GB); Gary L. Miller, Austin, TX (US)

(72) Inventors: Mark Maiolani, Glasgow (GB); Ray C. Marshall, Harpenden (GB); Gary L. Miller, Austin, TX (US)

(73) Assignee: NXP USA, INC., Austin, TX (US)

( * ) Notice: Subject to any disclaimer, the term of this patent is extended or adjusted under 35 U.S.C. 154(b) by 227 days.

(21) Appl. No.: 13/968,591

(22) Filed: Aug. 16, 2013

(65) Prior Publication Data

US 2015/0052405 A1    Feb. 19, 2015

(51) Int. Cl.
    *G06F 11/36* (2006.01)

(52) U.S. Cl.
    CPC ................. *G06F 11/3656* (2013.01)

(58) Field of Classification Search
    CPC . G06F 11/3664; G06F 11/362; G06F 11/3656; G06F 9/30003; G06F 31/31705
    See application file for complete search history.

(56) References Cited

U.S. PATENT DOCUMENTS

| | | | | |
|---|---|---|---|---|
| 5,544,311 A * | 8/1996 | Harenberg | .......... | G06F 11/2236 714/30 |
| 5,771,385 A * | 6/1998 | Harper | .......... | G06F 11/362 714/E11.21 |
| 5,903,718 A * | 5/1999 | Marik | .......... | G06F 11/261 714/38.13 |
| 6,101,598 A * | 8/2000 | Dokic | .......... | G06F 11/3656 712/210 |
| 6,298,394 B1 * | 10/2001 | Edwards et al. | ........ | 710/15 |
| 6,920,586 B1 * | 7/2005 | Moyer | .......... | G06F 11/3485 710/22 |
| 7,350,194 B1 * | 3/2008 | Alpern | .......... | G06F 11/362 714/E11.207 |
| 7,661,030 B2 * | 2/2010 | Bozak et al. | .......... | 714/25 |
| 7,665,002 B1 | 2/2010 | White et al. | | |
| 7,870,455 B2 | 1/2011 | Mayer | | |
| 7,979,745 B2 | 7/2011 | Moroda | | |
| 8,108,583 B2 * | 1/2012 | Clayton | .......... | G06F 13/28 710/308 |
| 8,402,258 B2 * | 3/2013 | Moyer | .......... | G06F 11/3636 712/227 |
| 8,904,118 B2 * | 12/2014 | Mamidala et al. | .......... | 711/147 |
| 9,009,673 B2 * | 4/2015 | Bates | .......... | G06F 9/44 717/125 |
| 9,292,395 B2 * | 3/2016 | Nakamura | .......... | G06F 11/2268 |
| 2002/0056047 A1 * | 5/2002 | Lehman | .......... | 713/200 |

(Continued)

*Primary Examiner* — Loan L. T. Truong (57) ABSTRACT

A data bus network interface module for enabling reception and transmission of application messages to/from at least one host processing module of an integrated digital signal processing device via a data bus network is described. The data bus network interface module being arranged to receive at least one data bus message from at least one remote network node via the data bus network, read an identifier field of the received at least one data bus message, and make data content of the received at least one data bus message available to at least one debug module if the identifier field comprises an identifier value defined for debug use.

14 Claims, 4 Drawing Sheets

(56) References Cited

U.S. PATENT DOCUMENTS

| | | | |
|---|---|---|---|
| 2004/0010778 A1* | 1/2004 | Kaler | G06F 11/362 717/130 |
| 2004/0073658 A1* | 4/2004 | Oran | H04L 12/24 709/224 |
| 2005/0172257 A1* | 8/2005 | Liang | G06Q 10/06 717/100 |
| 2005/0257102 A1* | 11/2005 | Moyer | G06F 11/3648 714/49 |
| 2006/0259824 A1* | 11/2006 | Sohm | G06F 11/323 714/38.13 |
| 2007/0180323 A1* | 8/2007 | Jones | G06F 17/5045 714/34 |
| 2007/0180334 A1* | 8/2007 | Jones | G06F 11/362 714/45 |
| 2008/0095143 A1* | 4/2008 | Lai | H04L 41/06 370/352 |
| 2008/0270898 A1* | 10/2008 | Petersen et al. | 715/700 |
| 2009/0037775 A1* | 2/2009 | Chi | G06Q 10/107 714/38.14 |
| 2009/0132666 A1* | 5/2009 | Rahman | H04L 41/0681 709/206 |
| 2009/0217251 A1* | 8/2009 | Connolly | G06F 11/263 717/140 |
| 2009/0307783 A1* | 12/2009 | Maeda et al. | 726/30 |
| 2010/0106809 A1* | 4/2010 | Grohman | 709/220 |
| 2010/0268990 A1* | 10/2010 | Xu | G06F 11/26 714/27 |
| 2010/0281308 A1* | 11/2010 | Xu | G06F 11/3636 714/45 |
| 2011/0119656 A1* | 5/2011 | Lee et al. | 717/128 |
| 2012/0117541 A1* | 5/2012 | Bates | 717/125 |
| 2012/0131555 A1* | 5/2012 | Hossain et al. | 717/124 |
| 2012/0151452 A1* | 6/2012 | Zinkovsky | G06F 11/362 717/129 |
| 2015/0006863 A1* | 1/2015 | McGowan | G06F 11/3636 712/227 |
| 2015/0006869 A1* | 1/2015 | Ehrlich | G06F 11/3636 712/244 |
| 2015/0033205 A1* | 1/2015 | Wintergerst | G06F 11/362 717/124 |

* cited by examiner

DATA BUS NETWORK INTERFACE MODULE AND METHOD THEREFOR

FIELD OF THE INVENTION

The field of this invention relates to a data bus network interface module and method therefor.

BACKGROUND OF THE INVENTION

It is known to provide microcontroller units (MCUs) with comprehensive debug capabilities to assist in the debug of end applications. Such debug capabilities may include run control and trace of core, read/write access to memories and registers, etc. Access to these debug capabilities is conventionally provided via dedicated debug interfaces, for example based on specialised standards such as IEEE 1149.1 JTAG (Joint Test Action Group) and/or IEEE-ISTO 5001 Nexus.

Such specialised interfaces are optimised for debug use and provide good debug functionality. Such interfaces may also be used for end applications where provision has been included to allow tool access to the required interface signals. This requirement for access to interface signals purely for debug use conflicts with pressure to minimise the number of signals made available at the MCU; the pressure to minimise the number of signals being due to the need to increase reliability, and to reduce cost and size. For applications where the MCU is potted in an epoxy compound, this problem of requiring access to interface signals for debug use is amplified since there is no easy way to access debug signals even if the electronic control unit that contains the MCU is opened.

In an attempt to avoid the need for additional signals to be made available purely for debug use, it is known to enable standard non-debug interfaces that are used for application traffic to also be used for debug use. For example, monitor type software may be run on one or more processing cores to support such debug use of standard non-debug interfaces. However, a problem with this approach is that it involves the use of processing and memory resources in order to run the monitor type software, which itself may affect the operation of an application that is being debugged. In addition, there is the possibility that the actual application fault that is to be debugged could itself cause the monitor code to stop executing correctly.

SUMMARY OF THE INVENTION

The present invention provides a data bus network interface module, a data bus network system comprising such a data bus network interface module, and a method of enabling access to debug resources within an integrated digital signal processing device via a data bus network as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

The present invention will now be described with reference to the accompanying drawings, and in particular with reference to a data bus network interface module adapted for use with a controller area network (CAN), and a method therefor. However, it will be appreciated that the present invention is not limited to use with such a CAN network, and may equally be applied to data bus network interface modules adapted for use with alternative networks, for example alternative vehicle bus networks such as, say, a local interconnect network (LIN), etc.

The present invention will also be described in terms of such a data bus network interface module being implemented within a microcontroller (MCU) device. For clarity, a microcontroller device comprises a signal processing device contained within a single integrated circuit device and comprising one or more processor cores, memory, programmable input/output peripherals, etc. Microcontrollers are typically designed for embedded applications, in contrast to microprocessors used in, for example, personal computers or other general purpose applications, or digital signal processors (DSPs) used in more specialised applications. However, it will be appreciated that the present invention is not limited solely to use within microcontroller devices, and may equally be implemented within alternative forms of integrated digital signal processing device, such as microprocessor devices, DSPs, etc.

Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
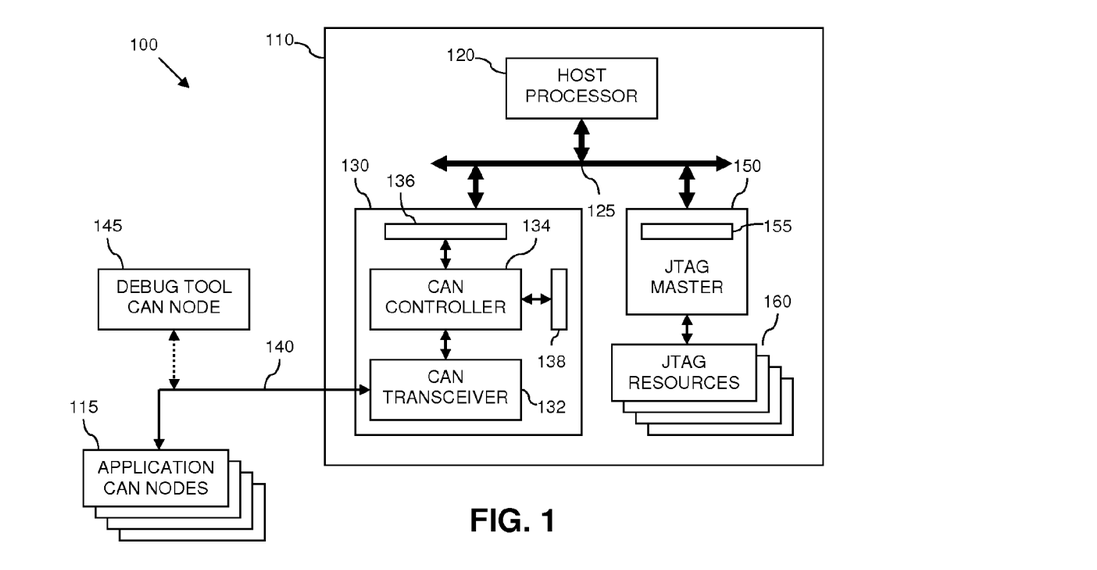
FIG. 1 illustrates a simplified block diagram of an example of a data bus network system.

Referring first to FIG. 1, there is illustrated a simplified block diagram of an example of a data bus network system 100, which in the illustrated example comprises a CAN system. An integrated digital signal processing device comprises, in the illustrated example, a microcontroller device 110 that forms one node of the CAN system 100. The microcontroller device 110 comprises one or more processing modules, such as the host processing module 120, for executing application program code and the like. The microcontroller device 110 further comprises other components such as, for example, memory, programmable input/output peripherals, etc. (not shown). The microcontroller device 110 comprises an interconnect component, illustrated generally at 125, for example comprising one or more (internal) data bus(es) and/or one or more crossbar switches (not shown).

The CAN system 100 comprises one or more further CAN nodes, as illustrated generally at 115 operably coupled together by a CAN bus 140. The microcontroller device 110 comprises at least one CAN interface module 130 for enabling reception and transmission of application messages to/from at least one host processing module 120 of the microcontroller device 100 via the CAN bus 140. The CAN interface module 130 is operably coupled to the host processor module 120, for example via the interconnect component 125 in FIG. 1, and in FIG. 1 is illustrated as comprising a transceiver component 132 and a CAN controller component 134. The transceiver component illustrated in FIG. 1 is arranged to transmit and receive CAN messages over the CAN bus 140. For example, when receiving CAN messages over the CAN bus 140, the transceiver component 132 may be arranged to adapt signal levels from the physical CAN bus 140 to levels that the CAN controller component 134 expects, and to convert transmit-bit signals received from the CAN controller component 134 into a signal that is sent over the physical CAN bus 140.

The CAN controller component 134 illustrated in FIG. 1 is arranged to store bits serially received over the CAN bus 140 (via the transceiver component 132), for example within an area of a memory element illustrated generally at 136, until an entire message has been received, and to then make the received message available to, conventionally, the host processor module 120. For example, the CAN controller component 134 may be arranged to trigger an interrupt signal for the host processor module 120 to indicate the availability of a CAN message within an area of the memory element 136 for the host processor module 120. Upon receipt of such an interrupt signal, the host processor module 120 may then fetch and process the received CAN message. The host processor module 120 may then read the received CAN message, and determine what action (if any) to take in response thereto. For example, such application CAN messages may comprise control/configuration information for peripheral devices connected to the microcontroller device 110, such as sensors, actuators and or control devices.

Furthermore, the CAN controller component 134 illustrated in FIG. 1 is arranged to receive application messages from the host processor module 120, and to transmit bits serially onto the CAN bus 140 (via the transceiver component 132). For example, the host processor module 120 may be arranged to load a message to be transmitted into an area of memory of the CAN interface module 130, such as an area of memory element 136, via the interconnect component 125, and to indicate to the CAN controller 134 that a message is available for transmission over the CAN bus 140.

Figure 2:
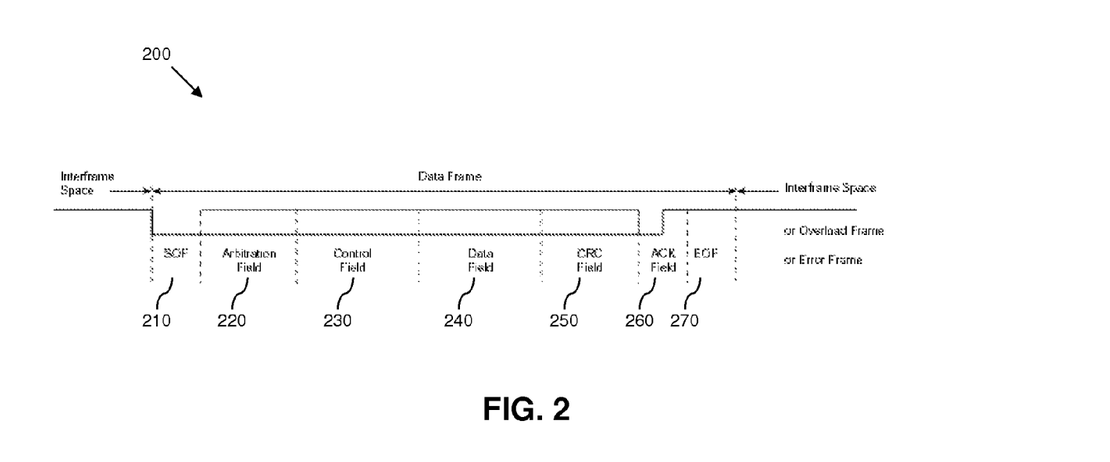
FIG. 2 illustrates a simplified example of a frame format for a data bus message.

FIG. 2 illustrates a simplified example of a typical frame format for a CAN message. The CAN message 200 comprises a start of frame field (SOF) 210, an arbitration field 220, a control field 230, a data field 240, a cyclic redundancy check (CRC) field 250, an acknowledgement (ACK) field 260 and an end of frame (EOF) field 270. The arbitration field 220 comprises an identifier value for data contained within the data field 240. In a conventional CAN system, in addition to enabling one or more intended recipients for the CAN message to be identified, the identifier value represents a priority of the message, and is used to arbitrate when two or more CAN nodes 110, 115 attempt to transmit over the CAN bus 140 at the same time. For example, if the CAN bus 140 is free, any node 110, 115 may begin to transmit. However, if two or more nodes 110, 115 begin sending messages at the same time, the message with the more dominant identifier will take precedence. In a typical CAN system, the signal patterns used are encoded in non-return-to-zero (NRZ) signal levels, with a signal representing a 'zero' bit value being dominant over a signal representing a 'one' bit value. Accordingly, the lower the identifier value the more dominant (and thus the higher the priority) the identifier value is. Specifically, a lower identifier value comprising more sequential zero bit values at its start will override a higher identifier value comprising less sequential zero bit values at its start. A transmitting CAN node 110, 115 is able to detect if a one bit value in the identifier value it is transmitting is overridden by a zero bit value being transmitted by a another more dominant node, and concede control of the CAN bus 140 to the dominant node 110, 115.

Accordingly, identifier values are typically required to be unique on a single CAN bus 140, otherwise two nodes 110, 115 could continue simultaneous transmission beyond the end of the arbitration (identifier) field 220, resulting in competing transmissions. The choice of identifier value may be defined on the basis of identifying the type of data contained within the data field 240 and/or the sending node 110, 115. Additionally/alternatively, the choice of identifier value may be defined on the urgency (e.g. the immediacy of a deadline) of the message.

Referring back to FIG. 1, in addition to enabling the reception and transmission of application messages to/from the host processor 120 via the CAN network 140, the CAN interface module 130 is further arranged to enable the reception and transmission of debug messages to/from one or more debug modules within the microcontroller device 110, such as the debug module 150 illustrated in FIG. 1. For example, the CAN controller component 134 of the CAN interface module 130 may be arranged to receive a CAN message via the CAN network 140, and read a non-data field, such as an identifier field, of the received CAN message. In the illustrated example of a CAN system 100, such an identifier field may be in the form of the arbitration field 220 illustrated in FIG. 2. It will be appreciated that in alternative data bus network message formats such an identifier field may comprise any suitable message field comprising an identifier value capable of enabling at least one intended recipient of a message to be identified. In this manner, the CAN controller component 134 is able to differentiate between received messages based on their respective non-data (e.g. identifier) values. In some examples, the CAN controller component 134 may be further arranged to compare a non-data (e.g. identifier) field value for a received CAN message with one or more values defined for debug use. For example, such value(s) defined for debug use (debug value(s)) may be defined by, say, a system designer and stored within an area of memory of the CAN controller component 134, for example the memory element 138 illustrated in FIG. 1. In some examples, such debug value(s) may reside within an area of non-volatile memory (not shown) of the microcontroller device 110, and loaded into the memory 138 of the CAN controller component 134 during start up, for example by hardware, firmware or software as part of the boot process for the microcontroller device 110. Thus, the CAN controller component 134 may be arranged to make data content of the received CAN message, e.g. data stored within the data field 240 of the CAN message, available to the debug module 150 if, for example, the identifier field 220 comprises an identifier value defined for debug use. By contrast, the CAN controller component 134 may be arranged to make data content of the received CAN message available to the host processor 120 if the identifier field comprises, in this example, an identifier value not defined for debug use.

In this manner, access to debug functionality within the microcontroller device 110 is provided via a standard application interface of the microcontroller device 110; i.e. via the CAN interface module 130 of the microcontroller device 110. For example, a debug tool or the like, such as illustrated at 145 may be connected to the CAN 140, for example as a CAN node. In this manner, the debug tool 145 is able to communicate with (e.g. send data to) the debug module 150 over the CAN bus 140 by using CAN messages comprising, for example, an identifier value defined for debug use. As such, a dedicated debug interface is not required to be implemented for the microcontroller device 110, thereby substantially alleviating the need for additional signals to be made available purely for debug use. Advantageously, the use of a CAN network in this manner enables substantially simultaneous use of the CAN network for application traffic and debug traffic.

Furthermore, and as described in greater detail below, by enabling the CAN interface module 130 to read, for example, an identifier field of a received CAN message, and to make data content of the received CAN message available to the debug module 150 if the identifier field 220 of the received CAN message comprises an identifier value defined for debug use, substantially no processing resources or loading of the host processor 120, and no memory resources therefor, are required for accessing the debug functionality of the microcontroller device 110. Specifically, no monitor type software is required to be run on a processing core of the microcontroller device 110 to support debug use of the standard non-debug CAN interface module 130. Accordingly, access to the debug functionality of the microcontroller device 110 is possible without affecting the operation of an application running on the host processor 120 that is being debugged.

In addition, the CAN interface module 130 in FIG. 1 is also arranged to receive data from the debug module 150 for transmission over the CAN bus 140 and, upon receipt of said data from the debug module 150, to generate one or more CAN messages containing the received data and comprising a non-data field value defined for debug use. In this manner, the debug tool 145 is able to also receive data from the debug module 150 within the microcontroller device 110, via the CAN network 140 and CAN interface module 130, without requiring processing resources or loading of the host processor 120, and no memory resources therefor.

In the illustrated example of FIG. 1, the debug module 150 is operably coupled to the interconnect component 125. In this manner, the CAN controller component 134 may be arranged to make data content of a received CAN message available to the debug module 150 by providing an indication to the debug module 150 that data is available therefor within the memory element 136 of the CAN interface module 130. Upon receipt of such an indication, the debug module 150 may then fetch and process the received data content. Similarly, the CAN controller component 134 may receive data to be transmitted over the CAN bus 140 by way of the debug module 150 loading such data into the an area of the memory element 136 of the CAN interface module 130, and providing an indication to the CAN controller component 134 that data is available for transmission over the CAN bus 140.

Alternatively, the CAN controller component 134 may be arranged to make the data content of a received CAN message available to the debug module 150 by writing the data to an area of memory directly accessible to the debug module 150, such as illustrated at 155. Similarly, the CAN controller component 134 may be arranged to fetch data for transmission over the CAN bus 140 directly from the area of debug memory 155 upon receipt of an indication that such data is available for transmission over the CAN bus 140.

In the illustrated example, the debug module 150 comprises a JTAG (Joint Test Action Group) master component, which comprises access to debug resources and capabilities within the microcontroller device 110, illustrated generally at 160 in FIG. 1, such as, for example, run control and trace of core, read/write access to memories and registers, etc. Such debug resources and capabilities are well known in the art, and accordingly are not described in greater detail herein. In this manner, the debug module 150 enables access to such debug resources and capabilities 160 within the microcontroller device 110 via the CAN interface module 130 and CAN bus 140. For example, the debug module 150 may be arranged to provide, say, a JTAG or Nexus interface, whereby data contained within debug messages transmitted over the CAN bus 140 may comprise debug commands encoded using a JTAG protocol format. In some examples, debug commands etc. contained within the data content of CAN messages may be constructed such that the debug module 150 is capable of translating and interpreting them without the need for application resources (e.g. application processing/memory resources).

Figure 3:
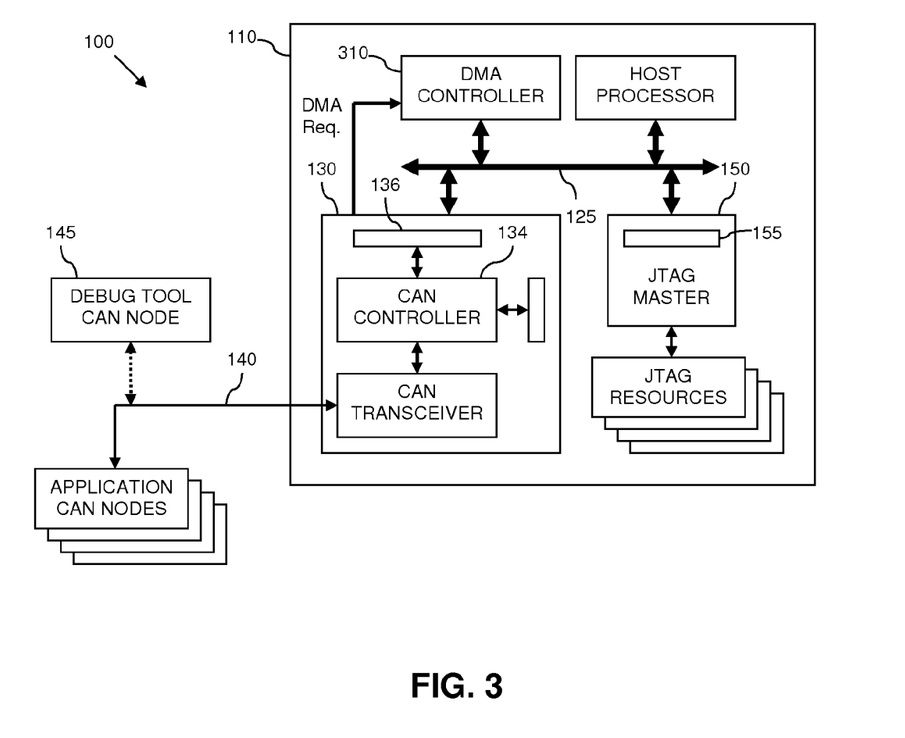
FIG. 3 illustrates a simplified block diagram of an alternative example of a data bus network system.

Referring now to FIG. 3, there is illustrated a simplified block diagram of an alternative example of the data bus network system 100. In the example illustrated in FIG. 3, the microcontroller device 110 comprises a direct memory access (DMA) module 210, and the CAN interface module 130 is arranged to make data content of received CAN messages available to appropriate components of the microcontroller device 110 by loading such data content into an area of memory accessible thereby, such as an area of memory element 136 in FIG. 3, and sending a request to the DMA module 310 for the DMA module 310 to transfer the data content to the appropriate component of the microcontroller device 110. For example, upon receipt of a CAN message over the CAN bus 140 comprising, for example, an identifier value defined for debug use, the CAN controller component 134 may be arranged to load the data content of received message in to the memory element 136, and to send a request to the DMA module 310 to transfer said data content to the debug module 150. Upon receipt of such a request from the CAN controller component 134, the DMA module 310 may be arranged to read the data content stored within the CAN module memory element 136, and write it to a memory element accessible by the debug module 150, such as memory element 155.

In some examples, upon receipt of such a request from the CAN controller component 134, the DMA module 310 may further be arranged to read data content stored within an area of the memory element 155, for example comprising debug information, and to write such data content to an area of the memory element 136 for transmission over the CAN bus 140. The CAN controller component 134 may accordingly be arranged to generate a CAN message comprising such debug data and an identifier value defined for debug use, and to transmit the generated message over CAN bus 140. The debug tool 145 connected as a CAN node to the CAN bus 140 may accordingly receive the message, recognise the identifier value as being defined for debug use and extract the debug data contained therein. In this manner, the debug tool 145 is able to write debug data to and received debug data from the debug module 150 within the microcontroller device 110 via the CAN bus 140 using only a single CAN message therefrom.

Thus, examples of data bus network modules and debug apparatus have been described that enable debug functionality within an integrated digital signal processing device to be accessed over a standard application interface without requiring processing resources or loading of a host processor. Furthermore, in the illustrated examples such access to debug functionality is provided using existing device resources used for supporting general application functionality, such as the CAN module 130, interconnect component 125, DMA module 120, etc., thereby minimising the additional cost of implementation required for providing such access.

Figure 4:
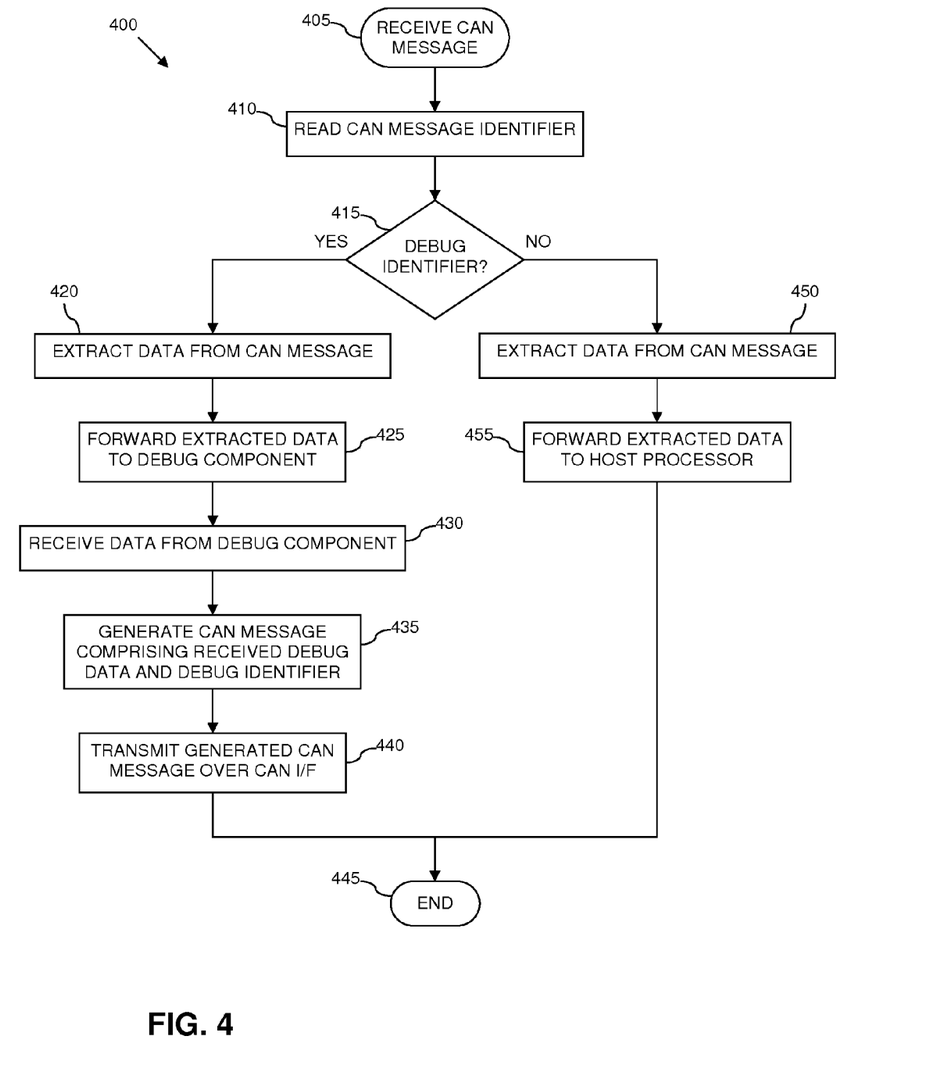
FIGS. 4 and 5 illustrate simplified flowcharts of examples of a method of enabling access to debug resources within an integrated digital signal processing device via a data bus network.

Referring to FIG. 4, there is illustrated a simplified flowchart 400 of an example of a method of enabling access to debug resources within an integrated digital signal processing device via a data bus network, for example such as implemented within the CAN module 130 in FIG. 1. The method starts at 405 with the receipt of a data bus message over a data bus interface, such as a CAN message received over the CAN bus 140 in the example illustrated in FIG. 1. Next, at 410, a non-data field, for example such as an identifier field, of the received data bus message is read, and it is then determined whether the non-data field of the received data bus message comprises a value, such as an identifier value, defined for debug use, at 415. If it is determined that the non-data field comprises a value defined for debug use, the method moves on to 420 where data content of the received data bus message is extracted, and the extracted data content is made available to an on-chip debug component at 425, for example the debug module 150 in the example illustrated in FIG. 1.

In the illustrated example, the method further comprises receiving debug data from the debug component, at 430 and generating a data bus message comprising the received debug data and a non-data field value, such as an identifier value, defined for debug use, at 435. The generated message is then transmitted over the data bus interface, at 440, and the method ends at 445. Referring back to 415, if it is determined that the non-data field comprises a value that is not defined for debug use, the method moves on to 450 where data content of the received data bus message is extracted and the extracted data content is made available to a host processing module at 455, such as the host processing module 120 in FIG. 1. The method then ends, at 445.

Figure 5:
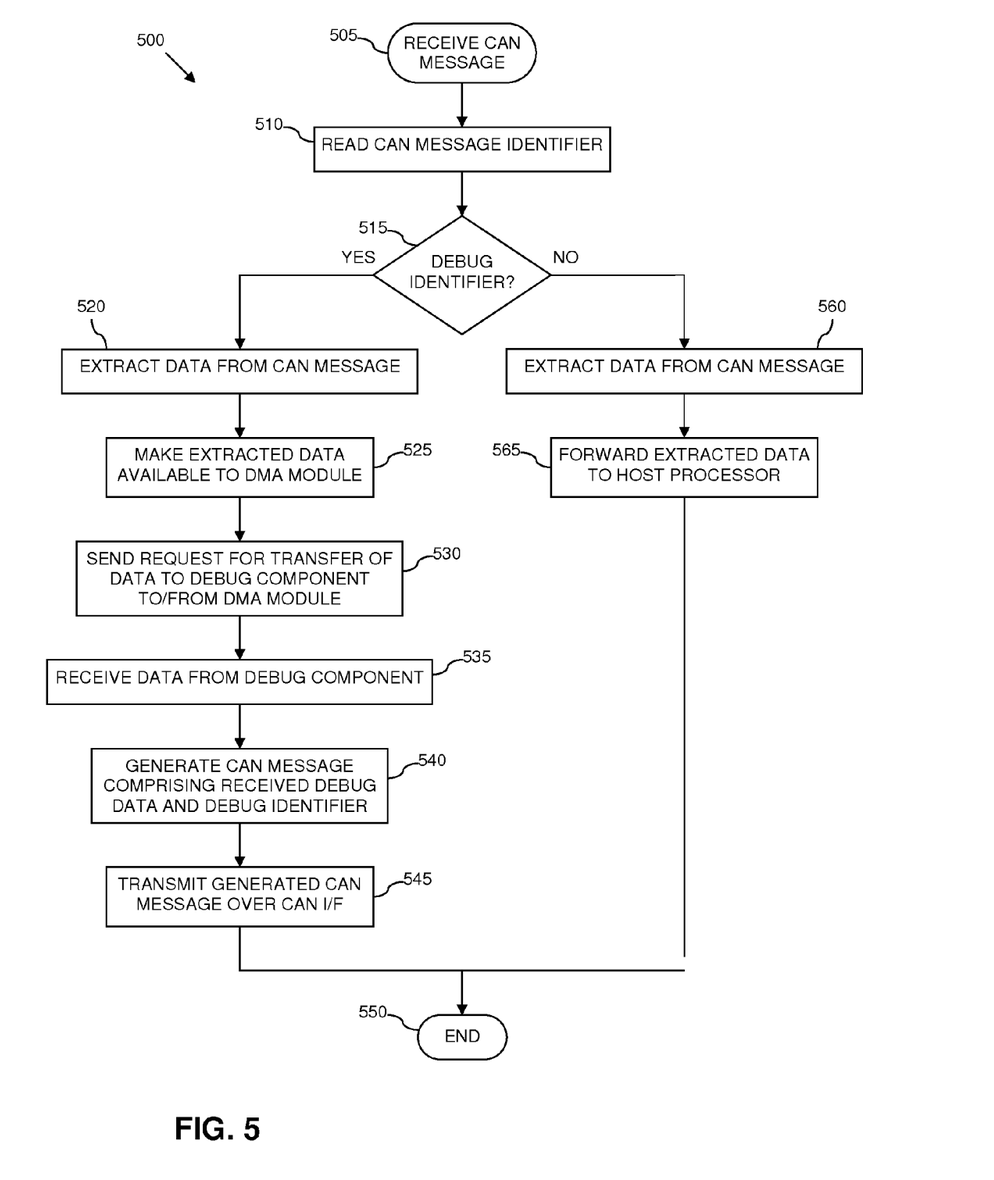

Referring to FIG. 5, there is illustrated a simplified flowchart 500 of an alternative example of a method of enabling access to debug resources within an integrated digital signal processing device via a data bus network, for example such as implemented within the CAN module 130 in FIG. 3.

The method starts at 505 with the receipt of a data bus message over a data bus interface, such as a CAN message received over the CAN bus 140 in the example illustrated in FIG. 3. Next, at 510, a non-data field, for example an identifier field, of the received data bus message is read, and it is then determined whether the non-data field of the received data bus message comprises a value defined for debug use, at 515. If it is determined that the non-data field comprises a value defined for debug use, the method moves on to 520 where data content of the received data bus message is extracted, and the extracted data content is made available to a DMA module at 425, for example the DMA module 310 in the example illustrated in FIG. 3. A request is then sent to the DMA module to transfer the extracted data to an on-chip debug component at 425, for example the debug module 150 in the example illustrated in FIG. 3.

In the illustrated example, the method further comprises receiving debug data from the debug component at 535, for example transferred by the DMA module, and generating a data bus message comprising the received debug data and, for example, an identifier value defined for debug use, at 540. The generated message is then transmitted over the data bus interface, at 545, and the method ends at 550. Referring back to 515, if it is determined that the non-data field comprises a value that is not defined for debug use, the method moves on to 560 where data content of the received data bus message is extracted and the extracted data content is made available to a host processing module at 565, such as the host processing module 120 in FIG. 1. The method then ends, at 550.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected', or 'operably coupled', to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an', as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an'. The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

What is claimed is:

1. A microcontroller device comprising:
   a host processing module;
   a debug module; and
   a data bus network interface module for enabling reception and transmission of application messages to/from a remote network node via a data bus network, the data bus network interface module being arranged to:
      receive a data bus message from the remote network node via the data bus network, read a non-data field of the data bus message, and make data content of the data bus message available to the debug module if the non-data field comprises a value defined for debug use; and
      receive data from the debug module for transmission over the data bus network and, upon receipt of said data from the debug module, to generate a second data bus message containing the received data and comprising a second non-data field value defined for debug use.

2. The microcontroller device of claim 1, wherein the data bus network interface module is further arranged to read an identifier field of the data bus message, and to make data content of the data bus message available to the debug module if the identifier field comprises an identifier value defined for debug use.

3. The microcontroller device of claim 1, wherein the data bus network interface module is further arranged to make the data content of the data bus message available to the host processing module only if the non-data field comprises a value not defined for debug use.

4. The microcontroller device of claim 1, wherein the data bus network interface module is further arranged to make the data content of the received data bus messages available to the debug module by loading said received data content into at least one memory element accessible by the data bus network interface module, and sending a request to a direct memory access module for said data content to be written from the at least one memory element accessible by the data bus network interface module to at least one memory element accessible by the debug module.

5. The microcontroller device of claim 1, wherein the data bus network interface module comprises a vehicle bus interface module.

6. The microcontroller device of claim 1, wherein the data bus network interface module comprises a controller area network interface module.

7. The microcontroller device of claim 1, wherein said microcontroller device is included at a die within a single integrated circuit package.

8. The device of claim 1, wherein the data received from the debug module for transmission over the data bus network is provided to a debug tool coupled to the data bus network.

9. A method comprising:
   receiving, at a data bus network interface module included at a microcontroller device, a data bus message from a remote network node via a data bus network;
   reading a non-data field of the received data bus message;
   making data content of the received data bus message available to a debug module included at the microcontroller device if the non-data field comprises a value defined for debug use; and
   receiving data from the debug module for transmission over the data bus network and, upon receipt of said data from the debug module, generating a second data bus message containing the received data and comprising a second non-data field value defined for debug use.

10. The method of claim 9, further comprising:
    reading an identifier field of the received data bus message, and making data content of the received data bus message available to the debug module if the identifier field comprises an identifier value defined for debug use.

11. The method of claim 9, further comprising:
    making data content of the received data bus message available to a host processing module included at a microcontroller device only if the non-data field comprises a value not defined for debug use.

12. The method of claim 9, further comprising:
    making data content of received data bus messages available to the debug module by loading said received data content into at least one memory element accessible by the data bus network interface module, and sending a request to a direct memory access module for said data content to be written from the at least one memory element accessible by the data bus network interface module to at least one memory element accessible by the debug module.

13. The method of claim 9, wherein the data bus network interface module comprises a vehicle bus interface module.

14. The method of claim 9, wherein the data received from the debug module for transmission over the data bus network is provided to a debug tool coupled to the data bus network.

* * * * *